(12) United States Patent
Feltham et al.

(10) Patent No.: US 11,249,711 B2
(45) Date of Patent: Feb. 15, 2022

(54) MOBILE DEVICE APPLICATION VIEW MANAGEMENT

(71) Applicant: International Business Machines Corporation, Armonk, NY (US)

(72) Inventors: Andrew S. Feltham, Hampshire (GB); Elizabeth J. Maple, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/665,801

(22) Filed: Oct. 28, 2019

(65) Prior Publication Data

US 2020/0057591 A1 Feb. 20, 2020

Related U.S. Application Data

(63) Continuation of application No. 15/397,917, filed on Jan. 4, 2017, now Pat. No. 10,592,185.

(51) Int. Cl.
*G06F 3/14* (2006.01)
*G06F 3/0484* (2013.01)
(Continued)

(52) U.S. Cl.
CPC ............ *G06F 3/14* (2013.01); *G06F 3/04847* (2013.01); *G09G 5/14* (2013.01); *G09G 2352/00* (2013.01);
(Continued)

(58) Field of Classification Search
CPC ......... G06F 3/14; G06F 3/04847; G09G 5/14; G09G 2352/00; G09G 2370/022; H04M 1/72586
See application file for complete search history.

(56) References Cited

U.S. PATENT DOCUMENTS

| 7,880,602 | B2 | 2/2011 | Kasamatsu |
| 7,932,831 | B2 * | 4/2011 | Malik ................ G06Q 30/02 340/573.1 |

(Continued)

FOREIGN PATENT DOCUMENTS

| WO | WO 2015033152 | 3/2015 |
| WO | WO 2015060856 | 4/2015 |
| WO | WO 2016097376 | 6/2016 |

OTHER PUBLICATIONS

Weppner, Jens, and Paul Lukowicz. "Bluetooth based collaborative crowd density estimation with mobile phones." 2013 IEEE international conference on pervasive computing and communications (PerCom). IEEE, 2013. (Year: 2013).*

(Continued)

*Primary Examiner* — Andrew T Chiusano

(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: obtaining output data of one or more sensor of a mobile device; prioritizing the first though Nth applications of the mobile device based on the output data and based on criteria characterizing the first through Nth applications; and establishing information for display on a display of the mobile device based on the prioritizing.

20 Claims, 7 Drawing Sheets

(51) Int. Cl.
*H04M 1/72472* (2021.01)
*G09G 5/14* (2006.01)

(52) U.S. Cl.
CPC ... *G09G 2370/022* (2013.01); *H04M 1/72472* (2021.01)

(56) References Cited

U.S. PATENT DOCUMENTS

| | | | |
|---|---|---|---|
| 8,201,213 B2 | 6/2012 | Young et al. | |
| 10,055,967 B1* | 8/2018 | Fields | H04L 51/32 |
| 2008/0263024 A1* | 10/2008 | Landschaft | G06F 16/9537 |
| 2010/0090816 A1* | 4/2010 | Hirsch | G06F 3/147 |
| | | | 340/438 |
| 2011/0314427 A1* | 12/2011 | Sundararajan | G06F 9/451 |
| | | | 715/863 |
| 2013/0014040 A1* | 1/2013 | Jagannathan | H04M 1/72569 |
| | | | 715/765 |
| 2014/0049487 A1* | 2/2014 | Konertz | G06F 1/1652 |
| | | | 345/173 |
| 2014/0053116 A1* | 2/2014 | Smith | G06F 3/0488 |
| | | | 715/863 |
| 2014/0167973 A1* | 6/2014 | Letchner | H04Q 9/00 |
| | | | 340/870.02 |
| 2014/0325476 A1* | 10/2014 | Sayers | G06F 8/427 |
| | | | 717/115 |
| 2014/0372918 A1* | 12/2014 | Wang | G06F 9/44505 |
| | | | 715/765 |
| 2015/0111558 A1 | 4/2015 | Yang | |
| 2015/0153831 A1 | 6/2015 | Kim et al. | |
| 2015/0301574 A1 | 10/2015 | Kim et al. | |
| 2015/0331711 A1* | 11/2015 | Huang | G06F 3/0481 |
| | | | 719/320 |
| 2016/0069679 A1* | 3/2016 | Jackson | G01C 22/006 |
| | | | 702/160 |
| 2016/0188023 A1* | 6/2016 | Chang | G09G 5/003 |
| | | | 345/173 |
| 2016/0239282 A1 | 8/2016 | Evans | |
| 2017/0046024 A1 | 2/2017 | Dascola et al. | |
| 2017/0115848 A1 | 4/2017 | Plammeier | |
| 2018/0189009 A1 | 6/2018 | Feltham et al. | |
| 2018/0211659 A1* | 7/2018 | Segal | G06F 3/167 |

OTHER PUBLICATIONS

The AI Behind Watson—The Technical Article, http:www.aaai.org/Magazine/watsib/Watson.php (19 pages).
https:///support.apple.com/en-us/HT205548—Use Glances on your Apple Watch, (3 pages).
Advancing from Offline to Online Activity recognition with Wearable Sensors—Miika Ermed, Juha Parkka, Member, IEEE, Luc Cluitmans—www.ncbi.nlm.nih.gov/nucleotide, (pp. 4451-4454).
App Components—https://developer.apple.com/watch/human-interface-guidelines/app-com, (6 pages).
Mell, Peter, et al., "The NIST Definition of Cloud Computing", National Institute of Standards and Technology, U.S. Department of Commerce, NIST Special Publication 800-145, Sep. 2011, (7 pages).
List of IBM Patents and/or Patent Applications treated as related U.S. Appl. No. 16/665,801, filed Oct. 28, 2019, dated Dec. 18, 2019.

* cited by examiner

MOBILE DEVICE APPLICATION VIEW MANAGEMENT

CROSS REFERENCE TO RELATED APPLICATION

This application is a continuation of U.S. application Ser. No. 15/397,917, filed Jan. 4, 2017, titled "Mobile Device Application View Management", which is incorporated by reference herein in its entirety.

TECHNICAL FIELD

The present disclosure relates to a mobile device in general and specifically to mobile view management.

BACKGROUND

Wireless communications (mobile communications) enable users to perform a variety of tasks using their mobile devices. An ever increasing number of applications is available for the wireless data processing systems, wireless data communication devices, or wireless computing platforms (collectively and interchangeably, "mobile device" or "mobile devices"). For example, many mobile devices not only allow the users to make voice calls, but also exchange emails and messages, access remote data processing systems, and perform web-based interactions and transactions.

Wearable devices are a category of mobile devices. A wearable device is essentially a mobile device, but has a form-factor that is suitable for wearing the device on a user's person. A user can wear such a device as an article of clothing, clothing or fashion accessory, jewelry, a prosthetic or aiding apparatus, an item in an ensemble, an article or gadget for convenience, and the like. Some examples of presently available wearable devices include, but are not limited to, smart watches, interactive eyewear, devices embedded in shoes, controllers wearable as rings, and pedometers.

SUMMARY

Shortcomings of the prior art are overcome, and additional advantages are provided, through the provision, in one aspect, of a method. The method can include, for example: obtaining output data of one or more sensor of a mobile device; prioritizing the first though Nth applications of the mobile device based on the output data and based on criteria characterizing the first through Nth applications; and establishing information for display on a display of the mobile device based on the prioritizing.

In another aspect, a computer program product can be provided. The computer program product can include a computer readable storage medium readable by one or more processing unit and storing instructions for execution by one or more processor for performing a method. The method can include, for example: obtaining output data of one or more sensor of a mobile device; prioritizing the first though Nth applications of the mobile device based on the output data and based on criteria characterizing the first through Nth applications; and establishing information for display on a display of the mobile device based on the prioritizing.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining output data of one or more sensor of a mobile device; prioritizing the first though Nth applications of the mobile device based on the output data and based on criteria characterizing the first through Nth applications; and establishing information for display on a display of the mobile device based on the prioritizing.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
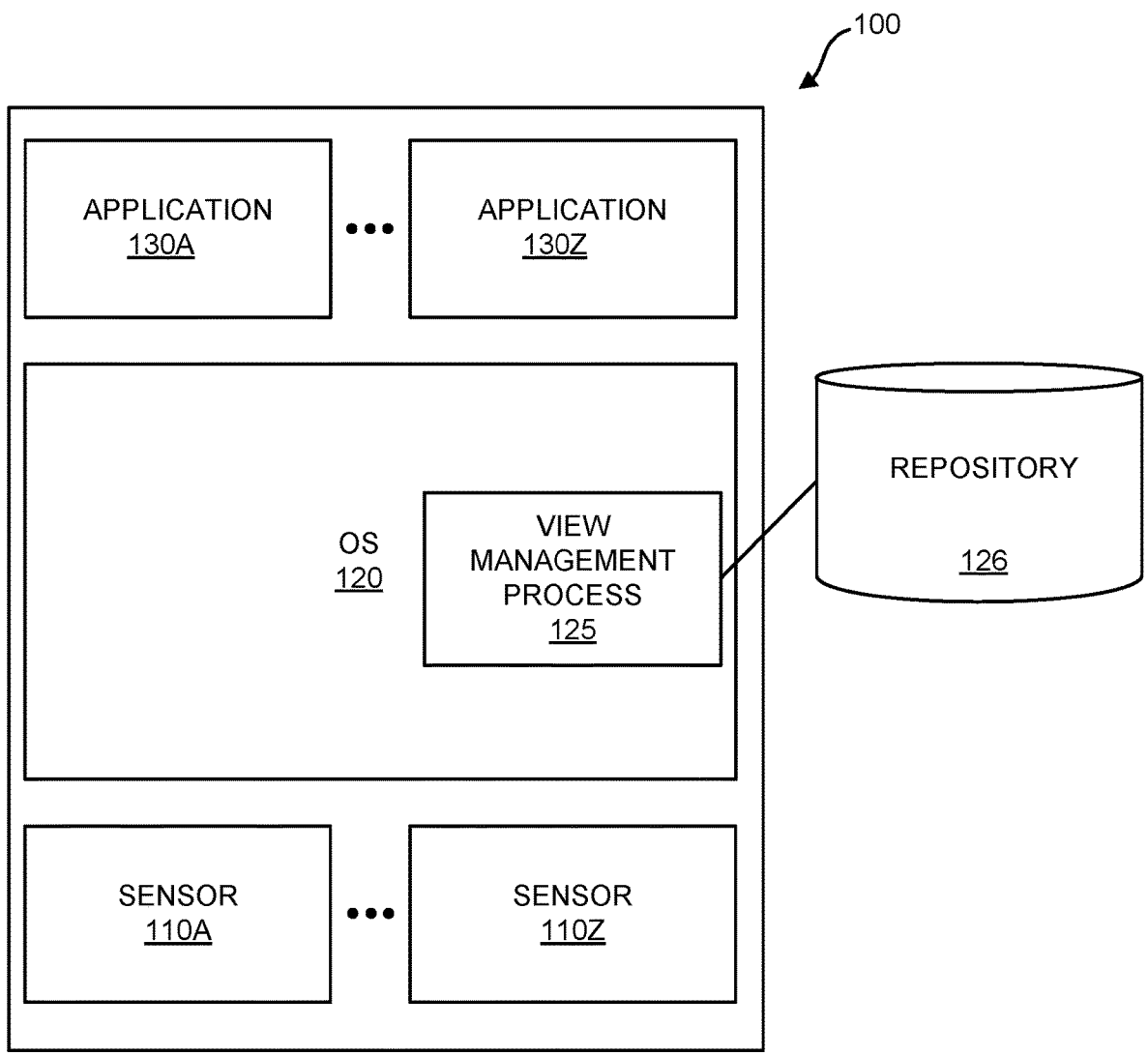
FIG. 1 is a schematic diagram of a mobile device according to one embodiment.

A schematic overview of mobile device 100 in one embodiment is shown in FIG. 1. Mobile device 100 can include a plurality of sensors 110A-110Z, an operating system 120 and a plurality of applications 120A-120Z. Sensors 100A-110Z can be different types and include e.g. one or more of a Global Positioning Sensor (GPS), a gyroscope, a barometer, a temperature sensor a humidity sensor, a network interface having a radio signal sensor for communication in accordance with a first wireless network communication protocol, a network interface having a radio signal sensor for communication in accordance with a second wireless network communication protocol. Applications 130A-130Z can be of different types and can include e.g. one or more of calendar application, a golf application, a running application, a swimming application, and a driving application. Operating system 120 in one embodiment can include a view management process 125 for performance of a method 200 as set forth in the flowchart of FIG. 2. View management process 125 can be in communication with data repository 126 in one embodiment.

Embodiments herein recognize that mobile devices do not always display information most relevant to a user. For example, mobile devices may have small displays and are only able to display a limited amount of information. A mobile device in one embodiment can have a small display such as in a mobile smartphone or in another embodiment can include an even smaller display such as in a wearable mobile device e.g. a smartwatch. Embodiments herein recognize that a mobile device may display information of a running application and that switching information of a display between first and second running applications may require an extended number of user input actions by a user using a user interface of the mobile device. For example, a mobile device can display information of different running applications according to a fixed priority and views corresponding to the different applications can be accessed according to priority by entering a swiping input into a user interface of the mobile device. If five actions are running a user may need to enter four swipes to view information of an application having the fifth priority. As a number of applications running increases manual user interface activity required to access displayed information from a certain application can be expected to increase posing increased inconvenience and risk to users of mobile devices.

Figure 2:
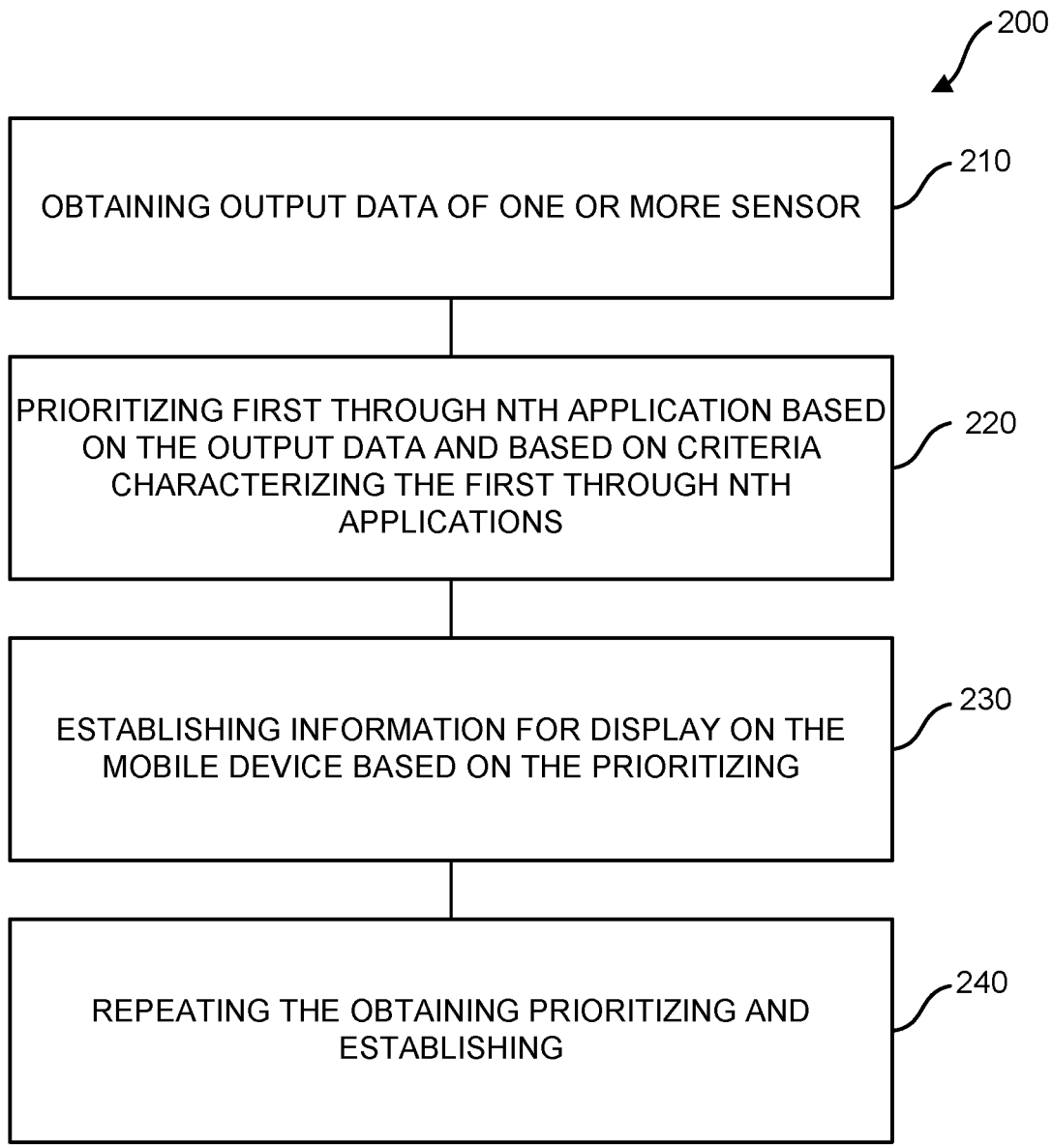
FIG. 2 depicts a flowchart illustrating method for use in managing device views according to one embodiment.

For enhancing user experience of a user of mobile device a method 200 that can be performed by mobile device 100 in one embodiment is shown in FIG. 2. Method 200 can include at block 210 obtaining output data of one or more sensor of a mobile device. Method 200 can include at block 220 prioritizing the first though Nth applications of the mobile device based on the output data and based on criteria characterizing the first through Nth applications. Method 200 can include at block 230 establishing information for display on a display of the mobile device based on the prioritizing. Method 200 can include at block 230 establishing information for display on a display of the mobile device based on the prioritizing. Method 200 can include at block 240 repeating the processing, prioritizing, and the establishing.

In one embodiment, view management process 125 can be configured to perform method 200. View management process 125 in one embodiment can be implemented as system software e.g. as part of operating system 120. Provided as system software e.g. as part of operating system 120 view management process 125 in one embodiment can run in the background of applications 130A-130Z of mobile device 100 and in one embodiment can have access to outputs of sensors 100A-110Z without requiring express permissions to such outputs.

Performance of method 200 can improve performance of mobile device 100 by establishing information for display determined to be relevant of a user. As noted Method 200 can include at block 210 obtaining an output of one or more sensor 110A-110Z of a mobile device 100 and at block 220 prioritizing the first though Nth applications of the mobile device based on the output data and based on criteria characterizing the first through Nth applications. In one embodiment prioritizing of applications of first though Nth applications of the mobile device at block 220 based on the output data and based on criteria characterizing the first through Nth applications can include comparing the determined activity profile to criteria characterizing first through Nth applications.

In one embodiment performing prioritizing by performing comparing at block 220 can include employing a scoring process. According to a scoring process a current activity profile for mobile device 100 can be scored for correspondence with a criteria characterizing each of first through Nth applications. At block 220 for performing scoring an activity profile for a mobile device 100 can be determined and can be compared to a criteria characterizing each of first through Nth applications. The determined activity profile can be scored a 1 when there is a perfect match between a determined activity profile and the criteria for an application. The determined activity profile can be scored a 0 when there is a perfect mismatch between a determined activity profile and the criteria for an application. A score for the determined activity profile can be provided for each of first through Nth application and each application can then be ranked in order score and prioritized in order of rank.

Prioritizing at block 230 in one embodiment can serve as a determination of which applications are likely to be most useful to a user and most likely to be used by a user of the mobile device given the current activity of the mobile device 100 as determined by the activity profile of the device. A user can therefore be displayed information, or have easier access to display of information more likely to be useful to a user of the mobile device 100.

At block 220 at which a mobile device 100 can prioritize applications mobile device 100 can determine an activity profile for mobile device 100. An example of an activity profile can include in one embodiment a data string including the following data items: coordinate location; speed; gesture signature; humidity, temperature, people count. Processing for providing some of the data items of an activity profile can include simply reading of an output of a sensor, e.g. for coordinate location (which can be provided by reading an output of a sensor provided by a GPS sensor), humidity (which can be provided by reading an output of a humidity sensor), and temperature (which can be provided by reading an output of a temperature sensor). Processing for providing some of the data items of an activity profile can include processing of sensor output data over time. For such processing view management process 125 can be in communication with data repository 126 which can store a history of sensor data over time. Processing for determining a mobile device speed can include processing a GPS output over time. Processing for determining a gesture signature can include e.g. providing a gyroscope output over time and deleting outputs at times where a gyroscope output indicates no motion or minor motion of mobile device 100. Processing for determining an elevation change can include e.g. examining for changes in a barometer sensor output over time. Processing for determining a people count can include counting sensed signals of a short range radio sensor of mobile device 100.

In one embodiment, data repository 126 can include a history repository (HR) and can store a history of sensor data over time, e.g. for resolving items such speed (which can be based on GPS outputs over time, gestures (which can be based on gyroscope outputs over time), and elevation changes (which can be based on barometer outputs over time). In one embodiment, data repository 126 can include a history repository (HR) and can store in addition or in the alternative e.g. one or more of a history of profiles, a history of displayed information, a history of user interface actions to display information, a history of speeds, a history of gestures, a history of elevations or the like. In one embodiment data repository 126 can include data for use in making logic decisions, e.g. in one embodiment data repository 126 can store a set of gesture templates for selection and comparison to a current gesture signature. View management process 125 in one embodiment can use a wide range of data stored in data repository 126 for determining a prioritization of applications.

Criteria that can be used in one embodiment for characterizing various applications is illustrated hereinbelow in Table A. In general a criteria that can be defined for an application can be a set of one or more of activities characterizing the mobile device when the application is run. Example characterizing activities can include e.g. being indoors, being outdoors, moving at a certain speed, being at a constant elevation, being at a changing elevation, being in a crowded area, being in a sparsely populated area, performing a certain gesture. Referring to Table, different mobile device application can have different criteria characterizing typically observed activities of the mobile device 100 when the application is run.

TABLE A

| APPLICATION | EXEMPLARY OUTPUTS OF SENSOR(S) USED FOR CRITERIA | DESCRIPTION OF EXEMPLARY ACTIVITY CHARACTERIZING CRITERIA |
| --- | --- | --- |
| Calendar | Temperature, humidity, GPS, radio (LAN) | Mobile device will be inside and at a specific location, e.g. an office location |
| Golf | GPS, gyroscope, barometer | Mobile device will be at a golf course location, a golf course gesture will have occurred, and an elevation change will have occurred. |
| Running | GPS, gyroscope, temperature, humidity, | Mobile device will be moving at a running speed, a running gesture will have occurred and the mobile device will be outside |
| Swimming | GPS, humidity, gyroscope | Mobile device will be at a swimming pool location, will be in water and a swimming gesture will have occurred |
| Driving | GPS, gyroscope | Mobile device will be moving at a driving speed and a steering wheel moving gesture will have occurred |
| Store shopper | Temperature, humidity, GPS, radio (short range) | Mobile device will be inside and at one of many possible in store shopping locations and based on being in a crowd of people will pick up may signals over the mobile device's short range radio. |

In one embodiment determined mobile device activity profiles as well as criteria of Table A can be expressed in formulae that permits comparing e.g. including scoring between activity profiles and criteria. In one embodiment a formulae expressing criteria of various applications can be provided as embedded system software (firmware) of mobile device 100. In another embodiment, mobile device 100 can include user interface functionality that allows a user to custom configure criteria that characterizes each of first through Nth applications 130A-130Z of mobile device 100.

Figure 3:
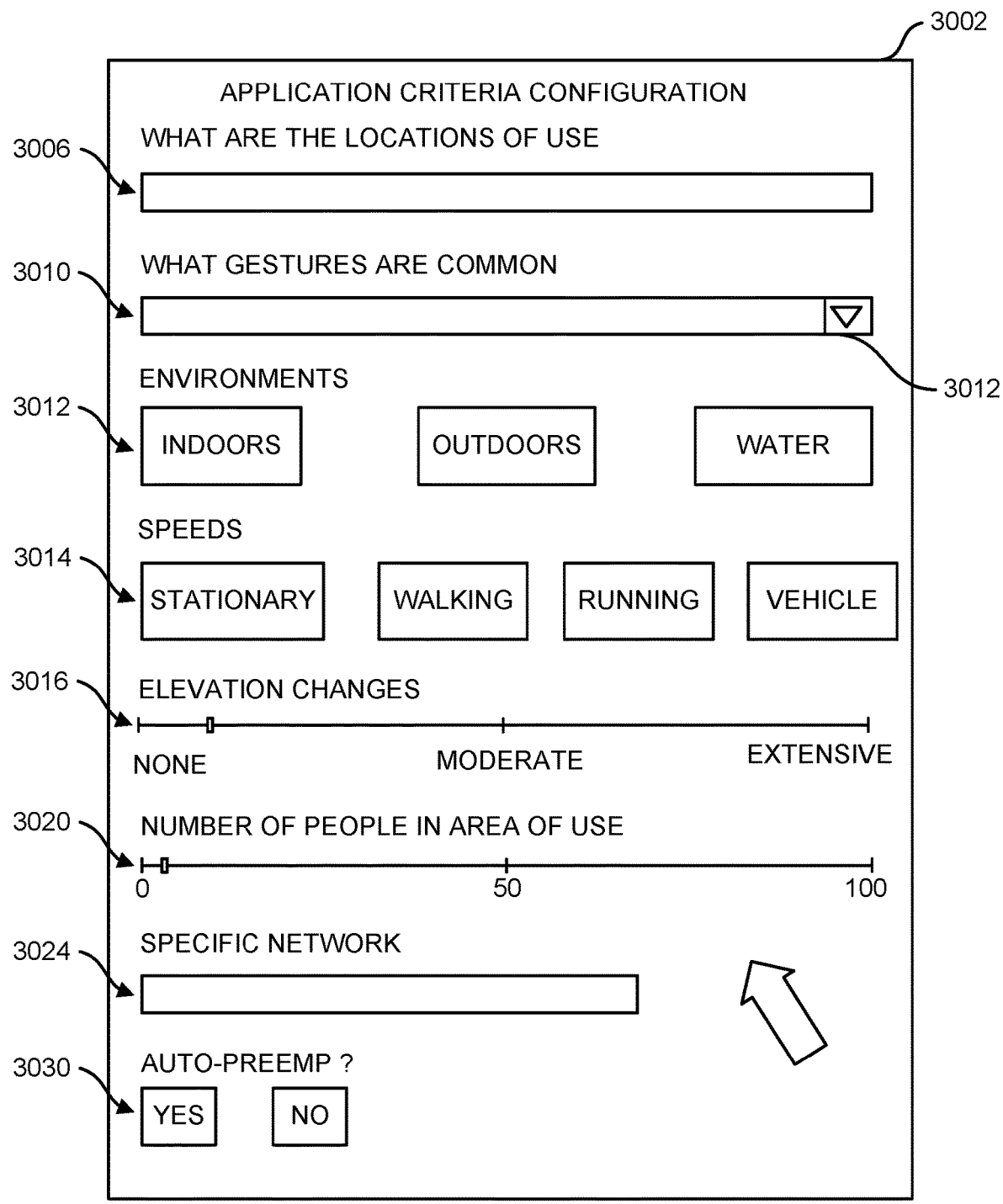
FIG. 3 depict a user interface for configuring criteria characterizing an application according to one embodiment.

FIG. 3 illustrates a user interface 3002 that allows a user of mobile device 100 to define criteria that characterizes an application of mobile device 100. A user can use user interface 3002 to configure each criteria of each application of mobile device 100. In the embodiment of FIG. 3 user interface 3002 provides a survey and mobile device 100 can configure criteria for a particular application based on survey information entered by a user. The survey as shown in the user interface 3002 can prompt a user for information on anticipated activities of an application, i.e. activities expected to be encountered when an application is used.

At area 3006 a user can specify locations where an application can be expected to be used. A user can specific one or more street address. A configuration process can use natural language processing. For example for configuring a golf course application, a user can enter in area 3006 "ALL GOLF COURSES" and a configuration process can responsively look up e.g. from an external mapping source location coordinates of all golf courses. For configuring a swimming application, a user can enter in area 3006 "ALL SWIMMING POOLS" and a configuration process can responsively look up e.g. from an external mapping source location coordinates of all swimming pools.

At area 3010 a user can specify gestures associated with an application. Again, a user in area 3010 can input text for natural language processing, and the configuration process described with reference to FIG. 3 can look up template gesture signature data based on the natural language input. In addition or alternatively a configuration process can store in an associated data repository 126 template gesture signature data indicators of which can be accessed by a drop down menu accessible with button 3012. Template gesture signature data may be made available for a variety of gestures, e.g. "golf swing", "swimming", "steering wheel control", "running".

At area 3012 a user can select expected environments of use, e.g. with buttons as shown for selection of indoors, outdoors or water. A configuration process can be provided so that a user can select one of such option or more than one of such options.

At area 3014 a user can select expected speeds of mobile device 100 during use of an application for which criteria is being configured, e.g. with buttons as shown for selection of stationary operation, walking speed, running speed or vehicle (e.g. land or airborne) speed. A configuration process can be provided so that a user can select one of such option or more than one of such options.

At area 3016 a user can select expected elevation changes during use of an application for which criteria is being configured. A user may select "NONE" using the slide selector graphic depicted e.g. if the application is likely to be used in one place or otherwise and a constant elevation, "MODERATE" e.g. if the application will be used in a hilly environment or in buildings having stairs, and "EXTENSIVE" e.g. where the application is to be airborne or for use in traversing a mountainous environment. According to method 200 elevation changes may be conveniently determined based on activity of a barometer sensor output which can output barometric pressure outputs that are responsive to elevation changes.

At area 3020 a user can select a number of people expected in an area of use of an application. For configuring a store shopper application for example, a user may select a large number of people, e.g. using the slide selector graphic depicted. According to method 200 a large number of people in an area may be conveniently determined based on activity of a short range, e.g. BLUETOOTH radio signal sensor output.

At area 3024 a user can specific a specific network association in which an application will be used. For example, for configuring a calendar application which a user may use at an Office, the user may designate a specific Office LAN network.

At area 3030 a user may specify whether the application being configured will pre-empt other applications if it determined to be a highest priority application at block 220. In some use cases, a user may wish that a display of mobile device 100 automatically display information of a highest priority application and can select YES button in area 3030 for such control. If a NO button is selected at area 3030 method 200 can still be operative to establish information for display on a display of mobile device 100 according to a determined priority, but may not automatically pre-empt information of a current application being displayed for display of information of an application having highest priority.

Referring again to the method 200 set forth in FIG. 2, obtaining at block 210, prioritizing at block 220 and establishing at block 230 can be repeated at block 240. In one embodiment repeating at block 240 can be performed throughout a power up time of mobile device 100 so that sensor output(s) obtained, a determined priority, and output information displayed based on the determined priority can updated repeatedly through a power up time of mobile device 100.

Figure 4:
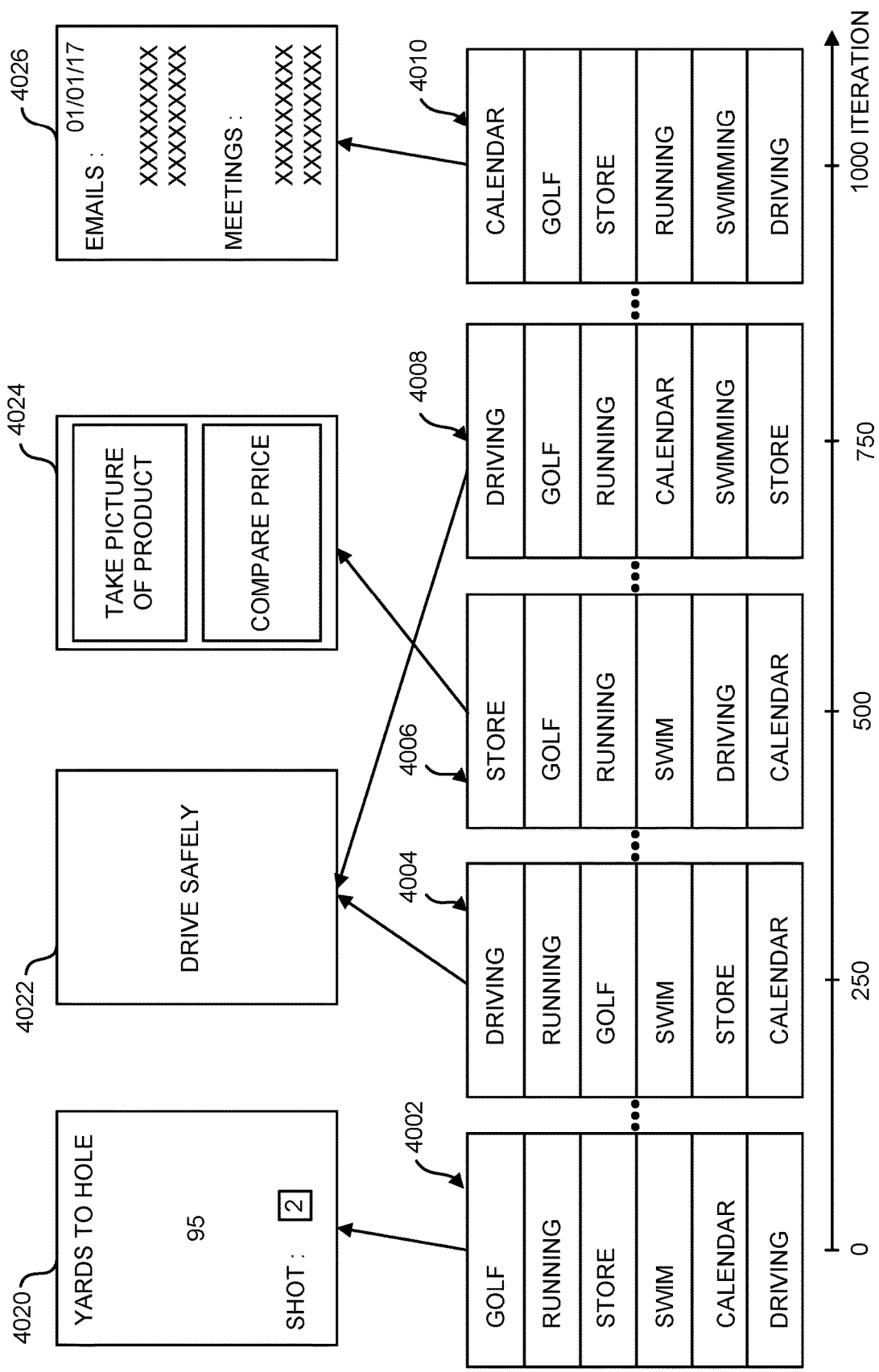
FIG. 4 depicts a timeline illustrating iterations of obtaining, prioritizing and establishing according to one embodiment.

An illustrative embodiment is shown in FIG. 4 wherein various determined application prioritizations of mobile device 100 are plotted on a timeline wherein iterations of establishing and prioritizing are also plotted. At iteration 0 (a first iteration on power up) performance of blocks 210 and 220 of method 200 can result in a prioritizing of applications according to list 4002. A user of mobile device 100 may be playing golf at a time of the first iteration. At iteration 250 performance of blocks 210 and 220 of method 200 can result in a prioritizing of application according to list 4004. A user may be driving from the golf course to a store at the time of iteration 250. At iteration 500 performance of blocks 210 and 220 of method 200 can result in a prioritizing of application according to list 4006. A user may be shopping at a store at a time of the iteration 500. At iteration 750 performance of blocks 210 and 220 of method 200 can result in a prioritizing of application according to list 4008. A user of mobile device 100 may be driving from the store to the user's office at the time of iteration 750. At iteration 1000 performance of blocks 210 and 220 of method 200 can result in a prioritizing of application according to list 4010. A user may be at the office at the time of iteration 1000.

It is seen from the timeline view of FIG. 4, that a prioritization of applications at block 220 can be changed by the repeating block 220 at block. By the performance of method 200 (FIG. 2) an output of information at block 230 can be based on a determined priority of applications at block 220. By the repeating establishing at block 240 output of information to a display of mobile device 100 can be updated. At a time of iteration 0 with the prioritization of list 4002 active a displayed user interface 4020 of mobile device 100 can include displayed information of a golf application determined at the time of iteration 0 to have the highest priority of applications running on mobile device 100. At a time of iteration 250 with the prioritization of list 4004 active a displayed user interface 4022 of mobile device 100 can include displayed information of a driving application determined at the time of iteration 250 to have the highest priority of applications running on mobile device 100. As shown by user interface 4022 a display associated to a Driving application can be de-featured e.g. can include a blank or substantially blank screen and may display only a safe driving message or no information at all so that a minimal amount of distractions can be presented to a user. Display of information of one application can preclude display of information of another application and this preclusion of information of other applications from display can yield substantial advantages e.g. when Driving application user interface 4022 is displayed and information of other applications can present a substantial distraction and risk. At a time of iteration 500 with the prioritization of list 4006 active a displayed user interface 4024 of mobile device 100 can include displayed information of a store shopping application determined at the time of iteration 500 to have the highest priority of applications running on mobile device 100. At a time of iteration 750 with the prioritization of list 4008 active a displayed user interface 4022 of mobile device 100 can include displayed information of a Driving application determined at the time of iteration 750 to have the highest priority of applications running on mobile device 100. At a time of iteration 1000 with the prioritization of list 4010 active a displayed user interface 4026 of mobile device 100 can include displayed information of a calendar application determined at the time of iteration 1000 to have the highest priority of applications running on mobile device 100.

Referring again to method 200 set forth in FIG. 2 establishing at block 230 information for display on a display of the mobile device based on the prioritizing in one embodiment as set forth in connection with FIG. 4 can include automatically changing an output of a display in response to a prioritizing at block 220 being performed that changes a prior prioritizing. In the specific embodiment described in connection with FIG. 4, a display of information on a display of a mobile device 100 can be responsive to a change in a highest priority application of a set of prioritized applications. When there is a change in a highest priority application, current information displayed on a display of a mobile device 100 can change to information of the highest priority application. However, in one embodiment, a changes in a highest priority application by performace of block 220 need not result in a change of any displayed information on a display of a mobile device 100. For example, establishing information for display on a display of the mobile device based on the prioritizing at block 230 in one embodiment can include outputting information responsively to one or more user input based on the current prioritizing of applications. In one embodiment, a change in a prioritization of applications may not result in change (by performance of establishing information for display at block 230) of the application association of current information displayed, but may result in change of the application association of next information that is displayed in response to one or more user input. For example, with a change in prioritization at block 220 and performance of establishing at block 230 information of a certain application which formerly was accessible with N user initiated actions entered into a user interface of the mobile device 100 (e.g. swipes of a display) may be instead accessible with M of the user initiated actions, where N and M are both integers and where M is not equal to N.

In one embodiment as set forth herein prioritization by performance of method can be based on an output of one or more sensor 110A-110Z. In one embodiment as set forth herein prioritization of applications 130A-130Z of mobile device 100 by performance of method 200 can be based on an output of one or more sensor 110A-110Z and based on one or more additional factor. An example of such one or more additional factor can include trends analysis. In one embodiment, view management process 125 can include a trends analysis machine learning engine that searches for trends in user usage of applications 130A-130Z by processing including examining of usage history information of data repository 126. In one embodiment, based on an output of a trends analysis machine learning engine, view management process 125 can adjust an order of a prioritization list. For example if a trends analysis machine learning engine reports that at a certain time of day a user always selects Application A, view management process 125 can responsively elevate the priority of Application A on the current prioritization list when the current time reached the certain time.

User interfaces for display on a display on a mobile device of the type described with reference to user interface 4020, 4022, 4024, 4026 can be operative so that user interface that is displayed is responsive to a swipe action user interface input of a user. For example if a user swipes a display displaying the user interface results in the next user interface being displayed. In one embodiment, a user interface displayed by a mobile device may be operative to be fixed until a user input is received to change the display; however, the order of next user interfaces to display on swiping to change the display can change based on a current determined prioritization of application. Take the example where a displayed user interface is the user interface 4024 but does not change unless there is a user input swiping input. If the current prioritization list that is active is list 4004, a first swipe results in information of Driving application being displayed, a second swipe results in information of Running application being displayed and a third swipe results in information of a Golf application being displayed. If the current prioritization list that is active changes to list 4008, a first swipe results in information of Driving application being displayed (user interface 4022), a second swipe results in information of a Golf application being displayed (user interface 4020) and a third swipe results in information of a Running application being displayed.

In one embodiment, wherein a change in a displayed user interface is responsive to change in a prioritization, the next user interface displayed responsively to a user swipe selection of a next user action can be based on a current prioritization. For example, with user interface 4022 active and prioritization list 4004 active a first user swipe can result in a Running application information being displayed and a second swipe can result in Golf application information being displayed. With user interface 4022 active and prioritization list 4008 active a first user swipe can result in a Golf application information being displayed and a second swipe can result in Running application information being displayed.

Certain embodiments herein may offer various technical computing advantages, involving computing advantages to address problems arising in the realm of computers such as by managing mobile device views where a mobile device may have a display of limited size which may be practically able to display information of one application at a time. In one embodiment an output of or more mobile device sensor can be obtained and prioritizing of application can be performed based on the obtaining. An output of information to a display can be based on the prioritizing. Some embodiments contemplate small screen displays of mobile devices which are able to display only a limited amount of information and so embodiments herein recognize special advantages of prioritizing display of information of a display in terms on enhanced functionality and responsiveness. Some embodiments employ system level software for performance of methods herein so access to sensor outputs can be realized and further so that several applications can be supported simultaneously. In various embodiments, a data repository such as history repository can be provided. A data repository can facilitate several analyses e.g. analyses for determining speed, gestures, elevation changes of a mobile device. A data repository can support operation of a machine learning engine for augmenting performance of a mobile device that may encounter and experience a variety of activities during the course of its use.

Figure 5:
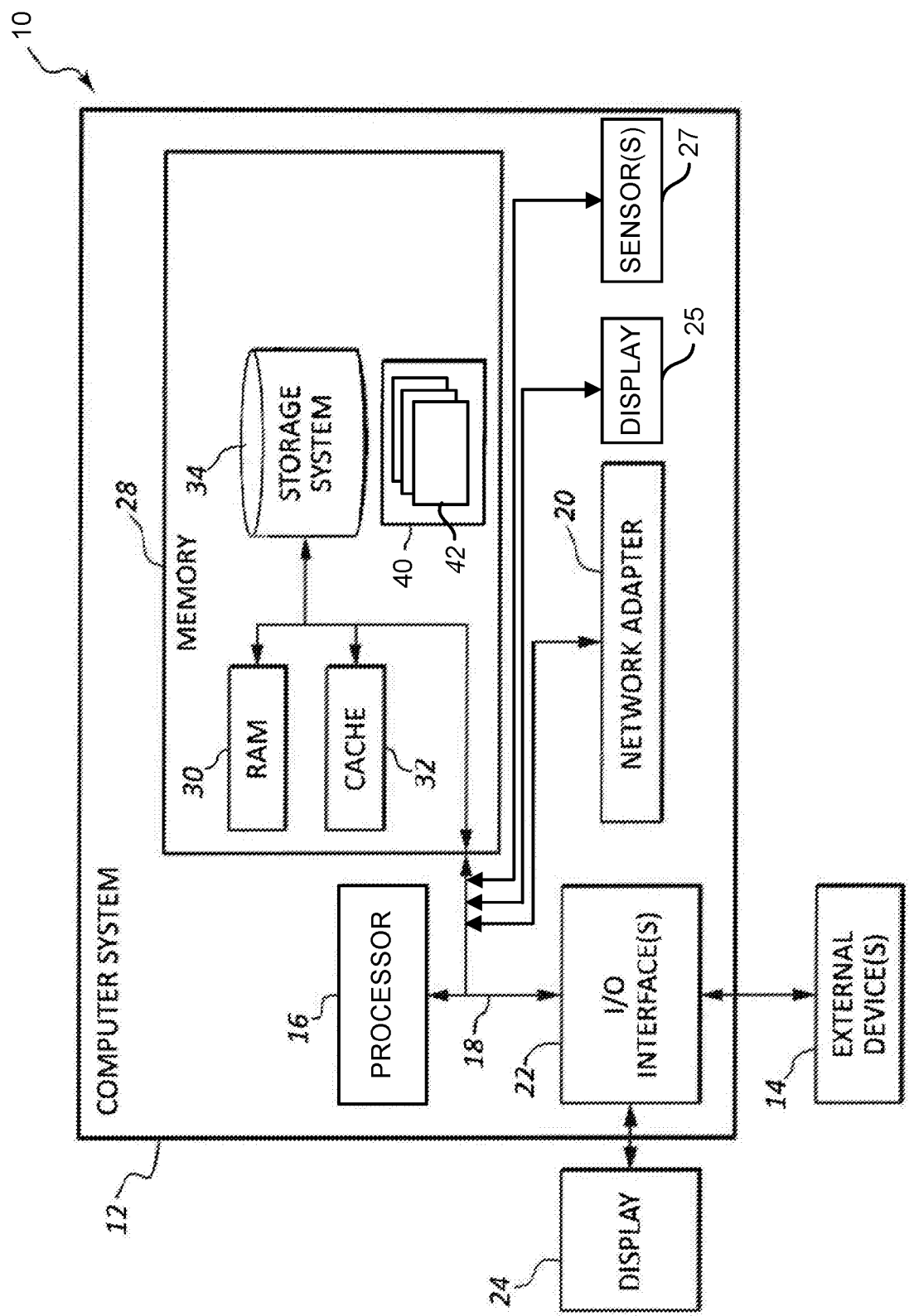
FIG. 5 depicts a computing node according to one embodiment.
Figure 6:
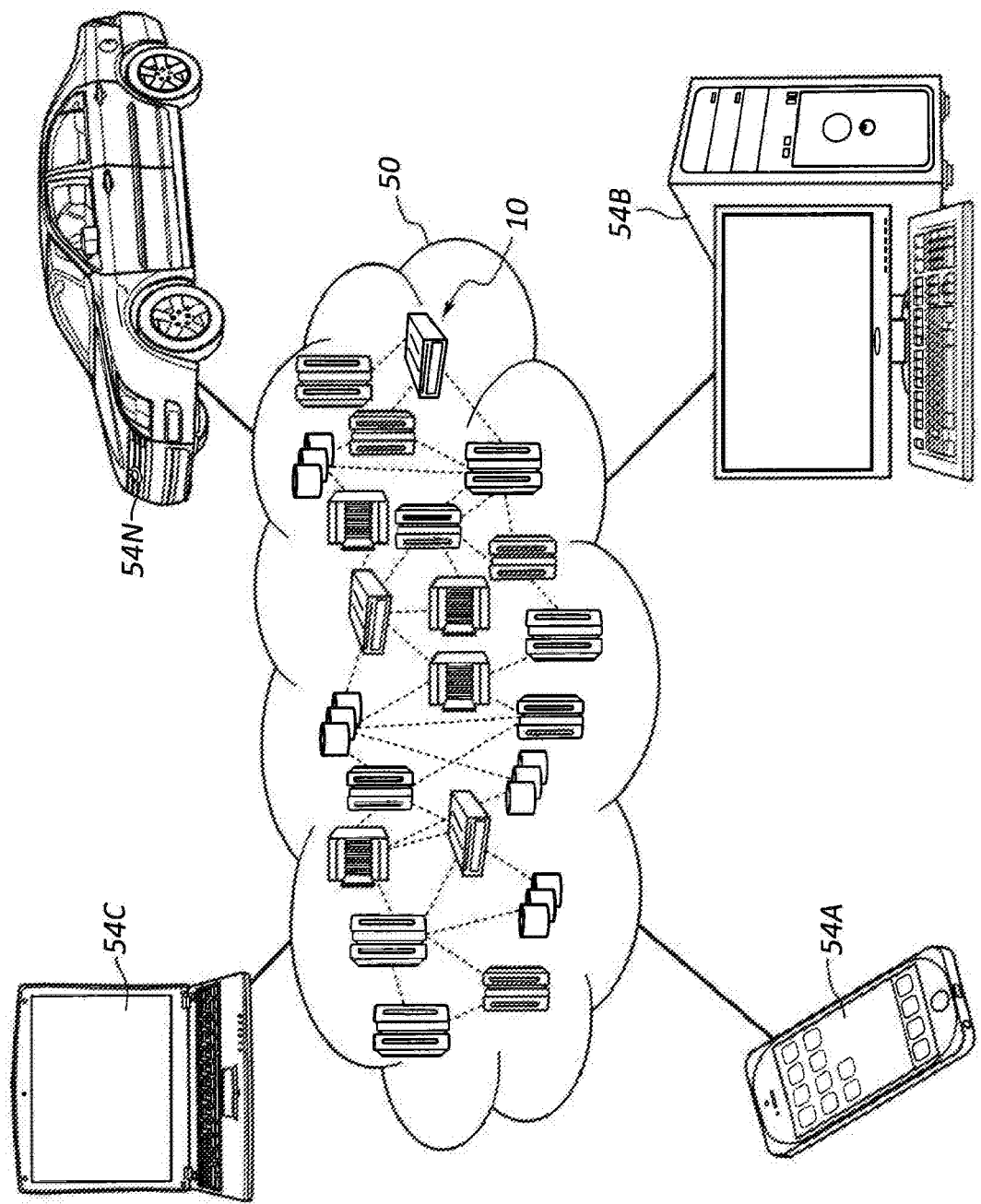
FIG. 6 depicts a cloud computing environment according to one embodiment.
Figure 7:
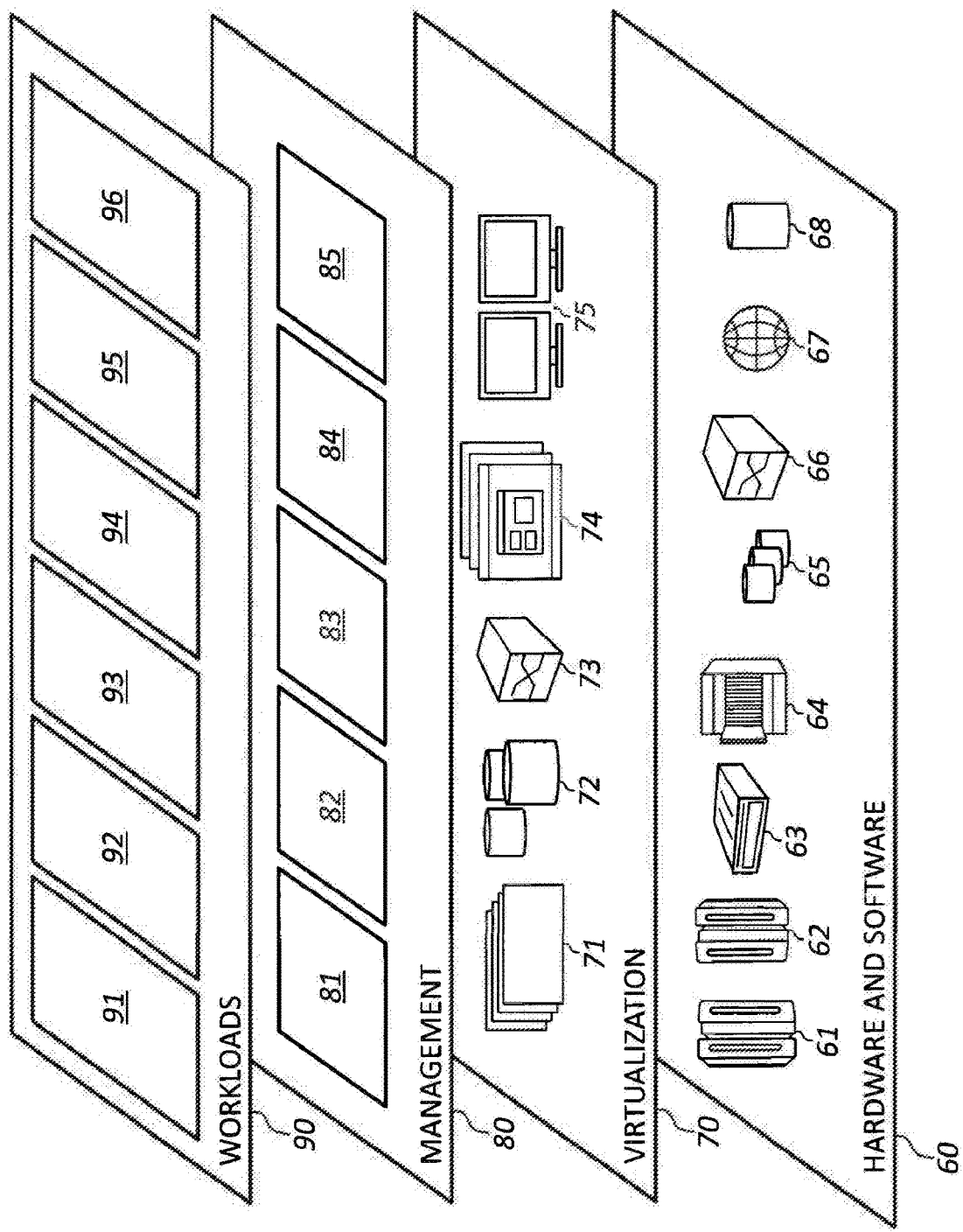
FIG. 7 depicts abstraction model layers according to one embodiment.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a general-purpose computing device. The components of computer system 12 may include, but are not limited to, one or more processors 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, mobile device 102 can include one or more computing node 10 and can include one or more program 40 for performing functions described herein e.g. with reference to method 200 of FIG. 2, the configuration functions described with reference to FIG. 3, and the prioritizing and display functions described with reference to FIG. 4. In one embodiment one or more program 40 can include view management process 125 as set forth in FIG. 1 which can perform method 200. One or more computing node 10 of mobile device 102 can be configured as a cloud computing node or as a computing node of a computing environment that is not a cloud computing environment.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a barometer, a temperature sensor, a humidity sensor or an audio input device. Computer system 12 can include one or more network adapter 20, e.g. one or more of network interfaces having a radio signal sensor. One or more sensor 110A-110Z as set forth in FIG. 1 can be provided e.g. by one or more sensor device 27 and/or one or more network adapter 20. In FIG. 6 computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for obtaining an output of one or more sensor, prioritizing applications and establishing information for output to a display of a mobile device based on the prioritizing as described herein. The processing components 96 can be provided by one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Forms of the term "defined by" herein encompass relationships where an element is partially defined by as well as relationships where an element is entirely defined by. Furthermore, a device or structure that is configured in a certain way is configured in at least that way, but may also be configured in ways that are not listed. Structures and methods herein described as having a certain number of elements can be practiced with less than or greater than the certain number of elements.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining output data of one or more sensor of a mobile device;
prioritizing first though Nth applications of the mobile device based on the output data and based on criteria characterizing the first through Nth applications; and
establishing information for display on a display of the mobile device based on the prioritizing, wherein the prioritizing includes determining an activity profile of the mobile device and scoring the activity profile in reference to criteria characterizing the first through Nth applications using a scoring function, wherein the first through Nth applications are prioritized in order of scores assigned to the activity profile for the respective applications of the first through Nth applications using the scoring function, wherein using the scoring function, for each of the first through Nth applications, there is provided an activity profile score returned that indicates a degree of matching between the activity profile for the mobile device and respective criteria characterizing each of the first through Nth applications, wherein the activity profile includes crowd density indicating data of the mobile device indicating current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the crowd density indicating data of the mobile device indicating current crowd density in a vicinity of the mobile device, and (b) crowd density criteria that specifies characterizing crowd densities associated to respective ones of the first through Nth applications.

2. The method of claim 1, wherein the prioritizing includes determining an activity profile of the mobile device and comparing the activity profile to criteria characterizing the first through Nth applications, wherein the first through Nth applications are currently running on the mobile device and wherein the mobile device is configured to display information of a certain one application of the first through Nth applications on the display of the mobile device at a given time.

3. The method of claim 1, wherein the mobile device is configured so that in response to a certain user initiated action entered into a user interface of the mobile device, the mobile device changes which of the first through Nth applications is a certain one application having information currently displayed on the display, and wherein the mobile device is configured so that a number of initiations of the certain user initiated action by the user to cause display of information of a particular application of the first through Nth applications on the display is in dependence on a current prioritization order of the first through Nth applications resulting from the prioritizing.

4. The method of claim 1, wherein criteria characterizing the first through Nth applications include user defined criteria, wherein the user defined criteria is entered using a configuration user interface for entering a gesture that permits a person configuring the method to specify a gesture that is expected to be performed by a user of the mobile device when each of the respective first through Nth applications is active, and wherein the configuration user interface for entering a gesture includes an area that allows a person configuring the mobile device to input text that specifies a gesture, and wherein the method includes processing the input text using natural language processing and wherein the method includes looking up template gesture signature data associated to the input text processed using natural language processing.

5. The method of claim 1, wherein criteria characterizing the first through Nth applications include user defined criteria, wherein the method includes presenting a configuration user interface that allows the user for each of the first through Nth applications to enter the user defined criteria characterizing the first through Nth applications, wherein the user interface for each of the first through Nth applications permits the user to enter each of the following: (a) data specifying locations expected to be encountered by the mobile device when the application is active; (b) data specifying gestures that are expected to be performed by a mobile device user of the mobile device when the application is active; (c) data specifying whether the mobile device is expected to be indoors, outdoors, or under water when the application is active; (d) data specifying whether the mobile device is expected to be stationary or experiencing walking, running, or vehicle speeds when the application is active; (e) data specifying an extent of elevation changes expected to be experienced by the mobile device when the application is active; and (f) data specifying a number of people in an area of the mobile device when the application is active, wherein the configuration user interface permits a person configuring the method to specify a gesture that is expected to be performed by a user of the mobile device when each of the respective first through Nth applications is active, and wherein the presented configuration user interface for entering a gesture includes an area that allows a person configuring the mobile device to input text that specifies the gesture that is expected to be performed by a user of the mobile device when each of the respective first through Nth applications is active, and wherein the method includes processing the input text using natural language processing and wherein the method includes looking up template gesture signature data associated to the input text processed using natural language processing, wherein the configuration user interface presents a sliding scale that allows the user to specify a number of people expected to be in an area of the mobile device when the application is active, wherein the sliding scale permits the user to enter a number of people in the range of zero people to 100 people, wherein the prioritizing includes determining an activity profile of the mobile device and comparing the activity profile to criteria characterizing the first through Nth applications using a scoring function, wherein according to the scoring function a relatively higher score is assigned to the activity profile for the mobile device with reference to a criteria characterizing a respective application of the first through Nth applications when the activity profile is more closely matched to the criteria characterizing the respective application, wherein according to the scoring function a relatively lower score is assigned to the activity profile for the mobile device with reference to a criteria characterizing a respective application of the first through Nth applications when the activity profile is more closely matched to the criteria characterizing the respective application, and wherein using the scoring function, the first through Nth applications are prioritized in order of scores assigned to the activity profile for the respective applications of the first through Nth applications using the scoring function, wherein using the scoring function, for each of the first through Nth applications, there is provided an activity profile score returned that indicates a degree of matching between the activity profile for the mobile device and respective criteria characterizing each of the first through Nth applications.

6. The method of claim 1, wherein the first through Nth applications are currently running on the mobile device and wherein the mobile device is configured to display information of a certain one of the first through Nth applications on the display of the mobile device at a given time and wherein the mobile device is further configured so that in response to a certain user initiated action entered into a user interface of the mobile device, the mobile device changes which of the first through Nth applications is a certain one application having information currently displayed on the display, and wherein the mobile device is configured so that a number of initiations of the user initiated action by the user to cause display of information of a particular application of the first through Nth applications on the display is in dependence on a current prioritization order of the first through Nth applications resulting from the prioritizing, wherein the method includes presenting a configuration user interface that allows the user for each of the first through Nth applications to enter user defined criteria characterizing the first through Nth applications, wherein the user interface for each of the first through Nth applications permits the user to enter each of the following: (a) data specifying locations expected to be encountered by the mobile device when the application is active; (b) data specifying gestures that are expected to be performed by a mobile device user of the mobile device when the application is active; (c) data specifying whether the mobile device is expected to be indoors, outdoors, or under water when the application is active; (d) data specifying whether the mobile device is expected to be stationary or experiencing walking, running, or vehicle speeds when the application is active; (e) data specifying an extent of elevation changes expected to be experienced by the mobile device when the application is active; and (f) data specifying a number of people in an area of the mobile device when the application is active, wherein the user interface presents a sliding scale that allows the user to specify a number of people expected to be in an area of the mobile device when the application is active, wherein the sliding scale permits the user to enter a number of people in the range of zero people to 100 people.

7. The method of claim 1, wherein the obtaining includes obtaining outputs from first and second different sensors, wherein each of the first and second different sensors is selected from the group consisting of a GPS sensor, a gyroscope, a humidity sensor, a temperature sensor, a short range radio, and a Local Area Network radio.

8. The method of claim 1, wherein the prioritizing includes determining the activity profile of the mobile device and comparing the activity profile to criteria characterizing the first through Nth applications, wherein criteria characterizing the first through Nth applications include user defined criteria.

9. The method of claim 1, wherein the activity profile further includes people count data of the mobile device indicating the current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the people count data of the mobile device indicating the current crowd density in a vicinity of the mobile device, and (b) crowd density criteria that specifies characterizing crowd densities associated to respective ones of the first through Nth applications.

10. The method of claim 1, wherein the activity profile further includes people count data of the mobile device indicating the current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the people count data of the mobile device indicating the current crowd density in a vicinity of the mobile device, and (b) crowd density criteria that specifies characterizing crowd densities associated to respective ones of the first through Nth applications, wherein the first application is a store shopper application having an associated store shopper application crowd density criteria, and wherein the method includes in response to an examination of the people count data indicating that the store shopper application crowd density criteria has been satisfied, prioritizing display of data of the store shopper application.

11. The method of claim 1, wherein the mobile device is configured to display information of a certain one of the first through Nth applications on the display of the mobile device at a given time, wherein the method includes presenting a configuration user interface that allows the user for each of the first through Nth applications to enter user defined criteria characterizing the first through Nth applications, wherein the user interface for each of the first through Nth applications permits the user to define data specifying a number of people expected in an area of the mobile device when the application is active.

12. The method of claim 1, wherein the mobile device is configured to display information of a certain one of the first through Nth applications on the display of the mobile device at a given time, wherein the method includes presenting a configuration user interface that allows the user for each of the first through Nth applications to enter user defined criteria characterizing the first through Nth applications, wherein the user interface for each of the first through Nth applications permits the user to define data specifying a number of people expected in an area of the mobile device when the application is active, wherein the activity profile further includes people count data of the mobile device indicating the current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the people count data of the mobile device indicating the current crowd density in a vicinity of the mobile device, and (b) crowd density criteria based on the user defined criteria characterizing the first through Nth applications that specifies characterizing crowd densities associated to respective ones of the first through Nth applications.

13. A system comprising:
a memory;
at least one processor in communication with the memory; and
program instructions executable by one or more processor via the memory to perform a method comprising:
obtaining output data of one or more sensor of a mobile device;
prioritizing first though Nth applications of the mobile device based on the output data and based on criteria characterizing the first through Nth applications; and
establishing information for display on a display of the mobile device based on the prioritizing, wherein the prioritizing includes determining an activity profile of the mobile device and scoring the activity profile in reference to criteria characterizing the first through Nth applications using a scoring function, wherein the first through Nth applications are prioritized in order of scores assigned to the activity profile for the respective applications of the first through Nth applications using the scoring function, wherein using the scoring function, for each of the first through Nth applications, there is provided an activity profile score returned that indicates a degree of matching between the activity profile for the mobile device and respective criteria characterizing each of the first through Nth applications, wherein the activity profile includes crowd density indicating data of the mobile device indicating current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the crowd density indicating data of the mobile device indicating current crowd density in a vicinity of the mobile device, and (b) crowd density criteria that specifies characterizing crowd densities associated to respective ones of the first through Nth applications.

14. The system of claim 13, wherein the obtaining includes obtaining outputs from first and second different sensors, wherein each of the first and second different sensors is selected from the group consisting of a GPS sensor, a gyroscope, a humidity sensor, a temperature sensor, a short range radio, and a Local Area Network radio.

15. The system of claim 12, wherein the prioritizing includes determining the activity profile of the mobile device and comparing the activity profile to criteria characterizing the first through Nth applications, wherein criteria characterizing the first through Nth applications include user defined criteria.

16. The system of claim 13, wherein the activity profile further includes people count data of the mobile device indicating the current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the people count data of the mobile device indicating the current crowd density in a vicinity of the mobile device, and (b) crowd density criteria that specifies characterizing crowd densities associated to respective ones of the first through Nth applications.

17. The system of claim 13, wherein the activity profile further includes people count data of the mobile device indicating the current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the people count data of the mobile device indicating the current crowd density in a vicinity of the mobile device, and (b) crowd density criteria that specifies characterizing crowd densities associated to respective ones of the first through Nth applications, wherein the first application is a store shopper application having an associated store shopper application crowd density criteria, and wherein the method includes in response to an examination of the people count data indicating that the store shopper application crowd density criteria has been satisfied, prioritizing display of data of the store shopper application.

18. The system of claim 13, wherein the mobile device is configured to display information of a certain one of the first through Nth applications on the display of the mobile device at a given time, wherein the method includes presenting a configuration user interface that allows the user for each of the first through Nth applications to enter user defined criteria characterizing the first through Nth applications, wherein the user interface for each of the first through Nth applications permits the user to define data specifying a number of people expected in an area of the mobile device when the application is active.

19. The system of claim 13, wherein the mobile device is configured to display information of a certain one of the first through Nth applications on the display of the mobile device at a given time, wherein the method includes presenting a configuration user interface that allows the user for each of the first through Nth applications to enter user defined criteria characterizing the first through Nth applications, wherein the user interface for each of the first through Nth applications permits the user to define data specifying a number of people expected in an area of the mobile device when the application is active, wherein the activity profile further includes people count data of the mobile device indicating the current crowd density in a vicinity of the mobile device, wherein the prioritizing the first though Nth applications of the mobile device based on the activity profile and based on criteria characterizing the first through Nth applications includes prioritizing the first though Nth applications of the mobile device based on each of (a) the people count data of the mobile device indicating the current crowd density in a vicinity of the mobile device, and (b) crowd density criteria based on the user defined criteria characterizing the first through Nth applications that specifies characterizing crowd densities associated to respective ones of the first through Nth applications.

20. A method comprising:
obtaining output data of one or more sensor of a mobile device;
prioritizing first though Nth applications of the mobile device based on the output data and based on criteria characterizing the first through Nth applications; and
establishing information for display on a display of the mobile device based on the prioritizing, wherein the prioritizing includes determining an activity profile of the mobile device and scoring the activity profile in reference to criteria characterizing the first through Nth applications using a scoring function, wherein the first through Nth applications are prioritized in order of scores assigned to the activity profile for the respective applications of the first through Nth applications using the scoring function, wherein using the scoring function, for each of the first through Nth applications, there is provided an activity profile score returned that indicates a degree of matching between the activity profile for the mobile device and respective criteria characterizing each of the first through Nth applications, wherein the mobile device is configured to display information of a certain one of the first through Nth applications on the display of the mobile device at a given time, wherein the method includes presenting a configuration user interface that allows the user for each of the first through Nth applications to enter user defined criteria characterizing the first through Nth applications, wherein the user interface for each of the first through Nth applications permits the user to define data specifying a number of people expected in an area of the mobile device when the application is active.

\* \* \* \* \*